United States Patent
Sharma et al.

(10) Patent No.: US 9,825,902 B1
(45) Date of Patent: Nov. 21, 2017

(54) ROUTE ADVERTISEMENT FOR NATIVE HARDWARE-BASED VIRTUAL IP ADDRESS ("VIP") ON LAYER 2/LAYER 3 SWITCH

(71) Applicant: CISCO TECHNOLOGY, INC., San Jose, CA (US)

(72) Inventors: Samar Sharma, San Jose, CA (US); Mouli Vytla, San Jose, CA (US); Nikhil Dhar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 222 days.

(21) Appl. No.: 14/737,225

(22) Filed: Jun. 11, 2015

Related U.S. Application Data (60) Provisional application No. 62/151,222, filed on Apr. 22, 2015.

(51) Int. Cl.
*G06F 15/177* (2006.01)
*H04L 29/12* (2006.01)
*H04L 29/08* (2006.01)
*H04L 29/06* (2006.01)

(52) U.S. Cl.
CPC .......... *H04L 61/2007* (2013.01); *H04L 67/10* (2013.01); *H04L 69/167* (2013.01)

(58) Field of Classification Search
USPC .................. 709/245, 230, 220, 223, 224
See application file for complete search history.

(56) References Cited

U.S. PATENT DOCUMENTS

| | | | |
|---|---|---|---|
| 9,432,294 B1 | 8/2016 | Sharma et al. | |
| 9,444,744 B1 | 9/2016 | Sharma et al. | |
| 2006/0087962 A1* | 4/2006 | Golia ............... | H04L 29/12009 370/216 |
| 2010/0265824 A1 | 10/2010 | Chao et al. | |
| 2011/0145390 A1* | 6/2011 | Kakadia ............ | G06F 9/505 709/224 |
| 2013/0044636 A1 | 2/2013 | Koponen et al. | |
| 2013/0051399 A1 | 2/2013 | Zhang et al. | |
| 2013/0142048 A1 | 6/2013 | Gross et al. | |
| 2013/0148505 A1 | 6/2013 | Koponen et al. | |
| 2013/0148542 A1 | 6/2013 | Zhang et al. | |
| 2013/0148543 A1 | 6/2013 | Koponen et al. | |
| 2013/0151661 A1 | 6/2013 | Koponen et al. | |
| 2013/0151676 A1 | 6/2013 | Thakkar et al. | |

(Continued)

OTHER PUBLICATIONS

U.S. Appl. No. 14/696,200, filed Apr. 24, 2015, entitled "Statistical Operations Associated With Network Traffic Forwarding," Inventor(s): Samar Sharma, et al.

(Continued)

*Primary Examiner* — Lan-Dai T Truong
(74) *Attorney, Agent, or Firm* — Polsinelli PC (57) ABSTRACT

In accordance with one example embodiment, there is provided a method for configuring a virtual IP address ("VIP") at a network element, wherein the configuring includes identifying at least one ingress interface of the network element for receiving traffic destined for the VIP and wherein the VIP is associated with a plurality of servers; determining whether the configuring indicates that the VIP is to be advertised; and advertising the configured VIP address to at least one neighboring network node if the configuring indicates that the VIP is to be advertised.

20 Claims, 6 Drawing Sheets

(56) References Cited

U.S. PATENT DOCUMENTS

2014/0372582 A1* 12/2014 Ghanwani ............... H04L 45/64
709/223
2015/0081762 A1* 3/2015 Mason .................... H04L 47/21
709/203
2016/0226755 A1* 8/2016 Hammam ........... H04L 12/4641

OTHER PUBLICATIONS

U.S. Appl. No. 14/693,925, filed Apr. 23, 2015, entitled "Selective Load Balancing of Network Traffic," Inventor(s): Samar Sharma, et al.
U.S. Appl. No. 14/696,226, filed Apr. 24, 2015, entitled "Load Balancing Methods for a Network Switch," Inventor(s): Samar Sharma, et al.
U.S. Appl. No. 14/871,561, filed Sep. 30, 2015, entitled "Load Balanceing Methods Based on Transport Layer Port Numbers for a Network Switch," Inventor(s): Samar Sharma, et al.
U.S. Appl. No. 14/728,839, filed Jun. 2, 2015, entitled "Internet Protocol Bucketing Mechanism to Classify and Process Network Traffic," Inventor(s): Samar Sharma, et al.

* cited by examiner

COMMAND SYNTAX:

[no] virtual [ip | ipv6] <ip-address> [<net mask> |
<prefix>] [ip | tcp <port-num> | udp <port-num>]
[advertise enable | disable]

- EXECUTED IN CLI CONFIGURATION MODE
- EXECUTED AS SUB-MODE OF ITD SERVICE CLI
- USED TO HOST VIP ON N7k, WITH ADVERTISE ENABLE
- ADVERTISE ENABLE IS RHI FOR ITD, CREATES STATIC ROUTES FOR THE CONFIGURED VIP
- THE STATIC ROUTES CAN BE REDISTRIBUTED, BASED ON USER CONFIGURED ROUTING PROTOCOL

N7k(config)# itd Web Traffic
N7k(config-itd)# ingress interface e3/1, e4/1-10
N7k(config-itd)# device-group WEBSERVERS
N7k(config-itd)# loadbalance method src-ip
N7k(config-itd)# virtual ip 210.10.10.100 255.255.255.255 advertise enable

FIG. 4

/*Cli to create a virtual ip and advertise it*/
switch(config-itd)# virtual ip 9.9.9.10 255.255.255.0 advertise enable
/*Sample Route created with VIP cli*/
switch(config)# sh ip route
IP Route Table for VRF "default"
'*' denotes best ucast next-hop
'**' denotes best mcast next-hop
'[x/y]' denotes [preference/metric]
'%<string>' in via output denotes VRF <string>
9.9.9.0/24, ubest/mbest: 1/0
*via 10.10.10.9, Eth7/2, [0/1], 04:17:16, static

ROUTE ADVERTISEMENT FOR NATIVE HARDWARE-BASED VIRTUAL IP ADDRESS ("VIP") ON LAYER 2/LAYER 3 SWITCH

RELATED APPLICATION

This application claims benefit under 35 U.S.C. §119(e) of U.S. Provisional Application Ser. No. 62/151,222, entitled "ROUTE ADVERTISEMENT FOR NATIVE HARDWARE-BASED VIRTUAL IP ADDRESS ("VIP") ON LAYER 2/LAYER 3 SWITCH," filed Apr. 22, 2015.

TECHNICAL FIELD

This disclosure relates in general to the field of communications networks and, more particularly, to a technique for route advertisement for native VIP on a Layer 2 ("L2")/Layer 3 ("L3") switch in such network elements.

BACKGROUND

Intelligent Traffic Director ("ITD") is a feature provided on the Nexus series of data center switches available from Cisco Systems, Inc., of San Jose, Calif. ITD provides, among other things, multi-Terabit load balancing at line rate. In order to load balance client network traffic to multiple servers on the backend, it is necessary to provide an IP address to which clients may direct traffic and from there, traffic is directed to one of the backend servers using one of several load balancing algorithms provided by ITD. A virtual IP address ("VIP") is an IP address assigned to multiple servers that form a device group, in contrast to each server or network interface card ("NIC") individually being assigned an IP address. Incoming data packets are sent to a VIP address and routed to actual servers at the switch. Single or multiple VIPs can be configured as part of an ITD service. Currently, VIPs are not automatically advertised to upstream routers. Additionally, there is currently no solution to natively host the VIP on an L2/L3 forwarding ASIC.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes configuring a virtual IP address ("VIP") at a network element, in which the configuring includes identifying at least one ingress interface of the network element for receiving traffic destined for the VIP and wherein the VIP is associated with a plurality of servers; determining whether the configuring indicates that the VIP is to be advertised; and advertising the configured VIP address to at least one neighboring network node if the configuring indicates that the VIP is to be advertised. The method may further include creating at least one route corresponding to the VIP, wherein the advertising comprises advertising the at least one route to the at least one neighboring network node. In certain embodiments, the network element may be a switch and the VIP may be configured in accordance with one of Internet Protocol version 4 ("IPv4") and Internet Protocol version 6 ("IPv6"). In some embodiments, the configuring may include indicating a netmask for the VIP or indicating a prefix for the VIP. The method may further include receiving at the at least one ingress interface traffic destined for the VIP. The configuring and/or advertising may be performed using a routing protocol.

EXAMPLE EMBODIMENTS

Figure 1:
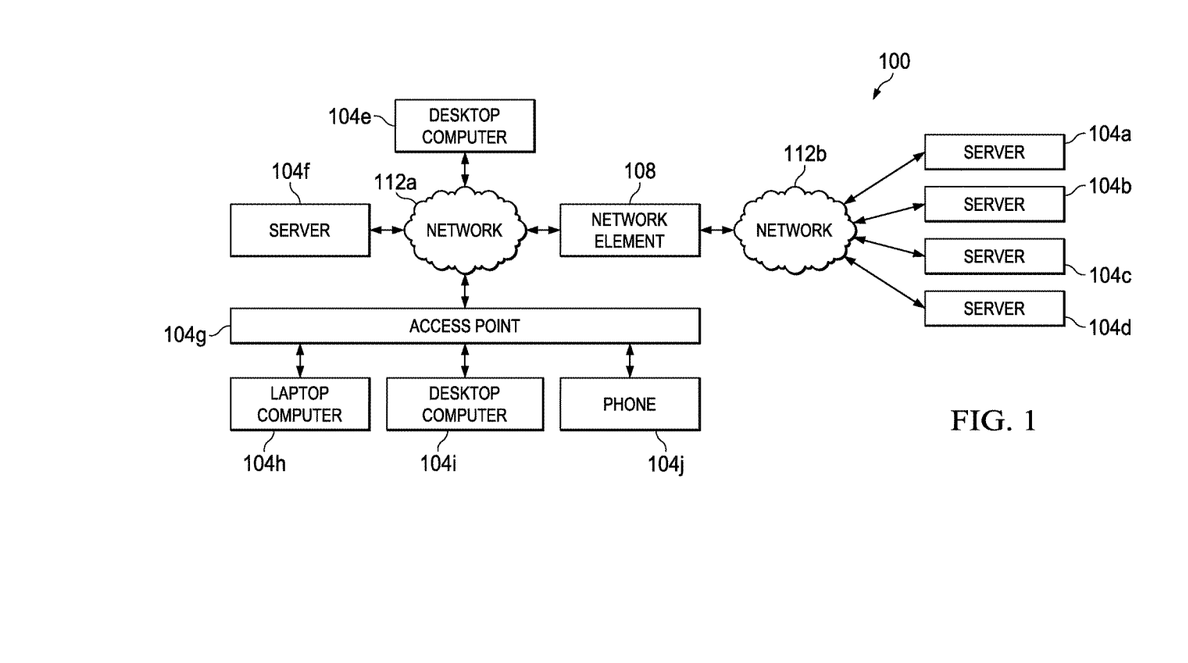
FIG. 1 illustrates a block diagram of a system for route advertisement for native hardware-based virtual IP addresses ("VIP") on an L2/L3 switch in accordance embodiments described herein.

FIG. 1 illustrates a block diagram of a system 100 for utilizing user-specified access control lists in conjunction with redirection and load-balancing on a port in accordance with certain embodiments. System 100 includes various network nodes 104 coupled to network element 108 via networks 112a and 112b. In operation, network element 108 forwards network traffic (e.g., data packets) from one or more network nodes 104 or an internal component of network element 108 to one or more other network nodes 104 or an internal component of network element 108. Network element 108 may implement various traffic forwarding rules derived from commands received from a network administrator associated with network element 108. For example, commands received may include access control list (ACL) commands, load balancing commands, and/or redirection commands. As an example, a network administrator may instruct network element 108 to permit some traffic and deny other traffic through one or more ACLs. On the traffic that is permitted, the network administrator instructs the network element 108 to apply redirection and/or load-balancing. Thus, the network element 108 may provide customization of the traffic forwarding by a network administrator.

As the number of network nodes in a network increases, complexity in the network increases as well. As the network complexity increases, implementation of customized traffic forwarding rules may require additional hardware and/or software resources, power, and time to implement, particularly if the customization is implemented in a serial fashion (e.g., a packet may go through logic implementing a user-specified ACL, and then different logic implementing a load balancer, and then other logic implementing redirection).

Various embodiments of the present disclosure provide systems and methods for simultaneously performing access control operations, load-balancing, and/or redirection operations. Such embodiments provide efficient utilization of network element 108's resources and faster operation than systems that perform traffic forwarding customization operations in a serial fashion. In particular embodiments, a user-specific ACL command may be implemented in parallel with a redirection and/or load balancing command in the same clock cycle of network element 108.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, load balancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with utilizing user-specified access control lists in conjunction with redirection and load-balancing. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 may be any device or system operable to exchange, transmit, and or receive information in a network environment. For example, network nodes may include network switches, routers, servers (physical servers or servers virtually implemented on physical hardware) (e.g., servers 104a-d and 104f), machines (physical machine or machines virtually implemented on physical hardware), end user devices (such as laptop 104h, desktop computer 104e and 104i, smartphone 104j), access points (e.g., 104g), cable boxes, gateways, bridges, load balancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

Each of network 112a, 112b, represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As will be described in detail below, network element 108 may be configured to advertise a VIP configured on network element 108 to neighboring routers, or nodes (e.g., within network 112a), to enable those routers to forward packets destined for the VIP to a designated ingress interface on the network element 108. Data packets destined for the VIP arriving at network element 108 are routed by network element 108 to individual servers (e.g., servers 104a-104d) of the device group identified by the VIP. Servers 104a-104d may be connected to network element 108 via network 112b, as illustrated in FIG. 1, or may be connected directly to ports of network element 108.

Figure 2:
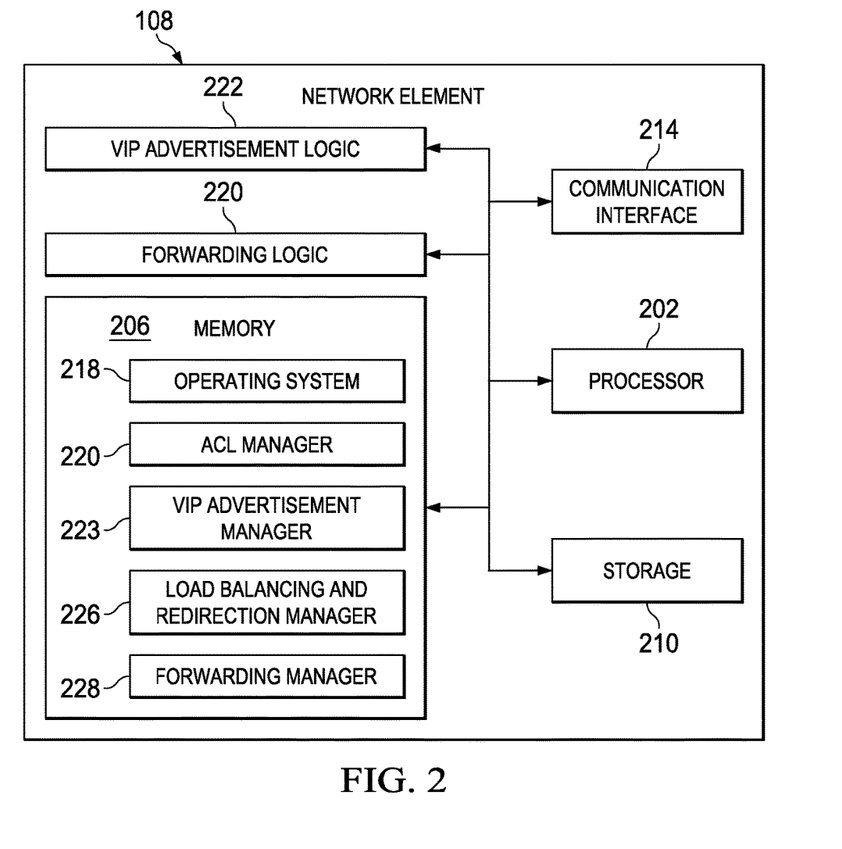
FIG. 2 illustrates a block diagram of a network element of the system of FIG. 1 in accordance with embodiments described herein.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and a display. As an example, network element 108 comprises a computer system that includes one or more processors 202, memory 206, storage 210, and one or more communication interfaces 214. These components may work together in order to provide functionality described herein. Network element 108 may include forwarding logic 220 operable to implement user-specified traffic forwarding rules to traffic received via communication interface 214 and send the results to communication interface 214 for forwarding out of the appropriate port of network element 108. Network element 108 may also comprise VIP advertisement logic 222. VIP advertisement logic 222 may be operable to automatically generate routes to VIPs configured on the network element 108 and to automatically advertise those routes to neighboring routers in accordance with features described herein.

Communication interface 214 may be used for the communication of signaling and/or data between network element 108 and one or more networks (e.g., 112a or 112b) and/or network nodes coupled to a network. For example, communication interface 214 may be used to send and receive data packets. Each communication interface 214 may send and receive data and/or signals according to a distinct standard such as Asynchronous Transfer Mode (ATM), Frame Relay, or Gigabit Ethernet (or other IEEE 802.3 standard). In a particular embodiment, communication interface 214 comprises one or more ports that may each function as an ingress and/or egress port. As one example, communication interface 214 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 206 and/or storage 210 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 206 and/or storage 210 may store any suitable data or information utilized by network element 108, including software embedded in a computer readable medium, and/or encoded logic incorporated in hardware or otherwise stored (e.g., firmware). Memory 206 and/or storage 210 may also store the results and/or intermediate results of the various calculations and determinations performed by processor 202.

In certain example implementations, the customized VIP advertising functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein should be construed as being encompassed within the broad term 'memory element.' Similarly, any of the potential processing elements, modules, and machines described in this Specification should be construed as being encompassed within the broad term 'processor.'

In one implementation, a network element 108 described herein may include software to achieve (or to facilitate) the functions discussed herein for VIP advertising where the software is executed on one or more processors 202 to carry out the functions. This could include the implementation of one or more instances of an operating system 218, VIP advertisement manager 223, and/or any other suitable elements that would foster the activities discussed herein. In other embodiments, one or more of these elements may be implemented in hardware and/or firmware such as reprogrammable logic in an ASIC.

In some embodiments, the operating system 218 provides an application program interface (API) that allows a network administrator to provide information to the network element 108. For example, the API may allow the network administrator to specify traffic customization information such as one or more ACLs, load balancing commands, and/or redirection commands. In various embodiments, a network administrator may specify the traffic customization information through one or more interfaces, such as a command-line interface (CLI) (e.g., manually entered or entered via a script) or a graphical user interface (GUI) using any suitable programming language (e.g., Extensible Markup Language (xml) or Python).

The operating system 218 may be capable of communicating the traffic customization information received from the network administrator to other portions of network element 108 (e.g., to VIP advertisement logic 222). In particular embodiments, the operating system 218 is operable to program logic of network element 108 based on VIP configuration information received from the network administrator.

In some example embodiments, an ACL manager 224 maintains and tracks ACLs. An ACL filters network traffic by controlling whether received packets are forwarded or blocked at one or more ports of the network element 108. In particular embodiments, an ACL may apply to traffic received from a single port. In other embodiments, the same ACL may apply to multiple ports.

An ACL may include one or more ACL entries. An ACL entry specifies matching criteria and an indication of whether packets that meet the matching criteria should be permitted (i.e., forwarded) or denied (i.e., blocked). Any suitable matching criteria may be specified, such as one or more identifiers associated with the source and/or destination of the packet. For example, the matching criteria may include one or more source Internet Protocol (IP) addresses, one or more destination IP addresses, one or more source MAC addresses, and/or one or more destination MAC addresses. In some embodiments, the matching criteria may include one or more protocols associated with the packet. For example, an ACL entry may apply only to traffic associated with a single protocol (e.g., Hypertext Transfer Protocol [HTTP]) or may apply to traffic associated with multiple protocols (e.g., HTTP, Secure Sockets Layer [SSL], and File Transfer Protocol [FTP]). In some embodiments, an ACL may include separate ACL entries that are each associated with a different protocol.

The ACLs managed by ACL manager 224 may be generated by any suitable entity, such as the network administrator or various features of network element 108. When an ACL is generated or received by a component of network element 108, the ACL is passed to the ACL manager 224. The ACL manager is responsible for sending the ACL to a forwarding entry manager 228 to be merged with load balancing and/or redirection entries. In addition to receiving and managing user-specified ACLs, the ACL manager may receive ACLs from any suitable feature of network element 108, such as a load balancer, a module implementing Web Cache Communication Protocol, a core policy (e.g., a policy that limits traffic going to processor 202 or a supervisor module associated with network element 108), etc.

In the embodiment depicted, ACL manager 224 is implemented at least in part by instructions stored in memory 206 and executed by processor 202. In some embodiments, ACL manager 224 may be implemented at least in part by hardware and/or firmware of network element 108.

The VIP configuration commands managed by VIP advertisement manager 223 may be generated by any suitable entity, such as the network administrator or various features of network element 108. When a VIP configuration command is generated or received by a component of network element 108, the command is passed to the VIP advertisement manager 226. In the embodiment depicted, VIP advertisement manager 223 is implemented at least in part by instructions stored in memory 206 and executed by processor 202. In some embodiments, VIP advertisement manager 223 may be implemented at least in part by hardware and/or firmware of network element 108.

In the illustrated embodiment, a load balancing and redirection manager 226 receives load balancing commands and redirection commands and communicates with forwarding logic 220 to implement these commands. In various embodiments, these commands may be converted into load balancing entries and/or redirection entries before being communicated to forwarding logic 220. In other embodiments, the load balancing commands and/or redirection commands are received in a format similar to the format for the load balancing entries and/or redirection entries described below, such that no conversion is needed.

A redirection entry may specify that traffic matching certain criteria should be redirected to a particular destination. A redirection entry specifies matching criteria and an indication of where to redirect packets that meet the matching criteria. Any suitable matching criteria may be specified, such as one or more identifiers associated with the source and/or destination of the packet. For example, the matching criteria may include one or more source IP addresses, one or more destination IP addresses, one or more source MAC addresses, and/or one or more destination MAC addresses. In some embodiments, the matching criteria may include one or more protocols associated with the packet. For example, a redirection entry may apply only to traffic associated with a single protocol (e.g., TCP or IP) or may apply to traffic associated with multiple protocols (e.g., TCP and IP).

A load balancing command may specify a load balancing scheme. For example, with respect to the embodiment depicted in FIG. 1, a load balancing scheme may specify how traffic forwarded by network element 108 is to be distributed among servers 104a-d. Network element 108 may load balance among any number of suitable network nodes 104, such as firewalls, application servers, other load balancers (e.g., load balancers that perform load balancing in software), inspection devices, etc.

In some embodiments, a load balancing command may be expressed at a higher level of abstraction than one or more corresponding load balancing entries that are created based on the load balancing command. For example, a load balancing command may specify that random network traffic is to be split evenly among the four servers 104a-d while the load balancing entries may specify matching criteria and redirection information to implement the load balancing scheme specified by the load balancing command. In some embodiments, the load balancing entries may have any suitable characteristics of the redirection entries described herein. However a load balancing entry facilitates implementation of a load balancing scheme.

In particular embodiments, a load balancing entry may apply to traffic received from a single port. In other embodiments, the same load balancing entry may apply to multiple ports. Similarly, a redirection entry may apply to one ingress port or multiple ingress ports.

The load balancing and redirection commands managed by load balancing and redirection manager 226 may be generated by any suitable entity, such as the network administrator or various features of network element 108. When a load balancing or redirection command is generated or received by a component of network element 108, the load balancing or redirection command is passed to the load balancing and redirection manager 226. The load balancing and redirection manager 226 is responsible for sending the load balancing and redirection commands (or corresponding entries) to the forwarding entry manager 228 to be merged with one or more ACL entries. In various embodiments, load balancing and redirection manager 226 may update the load balancing entries in response to a change in network topology (e.g., in an additional network node 104 becomes available or one of the network nodes 104a-d goes down).

In the embodiment depicted, load balancing and redirection manager 226 is implemented at least in part by instructions stored in memory 206 and executed by processor 202. In some embodiments, load balancing and redirection manager 226 may be implemented at least in part by hardware and/or firmware of network element 108.

In particular embodiments, forwarding entry manager 228 is operable to merge one or more ACL entries with one or more load balancing entries and/or redirection entries to create a set of one or more forwarding entries. A forwarding entry may have any suitable characteristics of an ACL entry, a load balancing entry, or a redirection entry as described herein. Merging multiple entries to create one or more forwarding entries may involve any suitable operations, such as a logical AND operation based on a portion of at least two of the entries. The result of the merging operations is a set of forwarding entries that implements each ACL, load balancing, and redirection entry received as input to the forwarding entry manager 228. One forwarding entry may simultaneously implement operations associated with an ACL entry and a load balancing entry (or redirection entry) when applied to incoming network traffic.

In particular embodiments, forwarding entry manager 228 creates one or more additional forwarding entries after generating the forwarding entries from the ACL entries and the load balancing entries and/or redirection entries. For example, if the existing forwarding entries do not cover each possible scenario, a default forwarding entry (that may be applied if no other match is found) may be generated that denies all traffic (e.g., if the forwarding entries include one or more entries permitting certain traffic) or permits all traffic (e.g., if the forwarding entries include one or more entries denying certain traffic). In various embodiments, the traffic forwarding entries may have a priority assigned, such that a traffic forwarding entry with a higher priority is checked for a match with a packet to be forwarded before the traffic forwarding entry with the lower priority is checked for a match with the packet. In some embodiments, the default forwarding entry has the lowest priority of the traffic forwarding entries. In various embodiments, the priorities of the traffic forwarding entries are based on user-specified rules associated with the ACL entries and load balancing and/or redirection entries merged to form the traffic forwarding entries.

The forwarding entry manager 228 is responsible for sending the forwarding entries to the forwarding logic 220 to be implemented. In the embodiment depicted, forwarding entry manager 228 is implemented at least in part by instructions stored in memory 206 and executed by processor 202. In some embodiments, forwarding entry manager 228 may be implemented at least in part by hardware and/or firmware of network element 108.

Forwarding logic 220 is operable to apply the forwarding entries to the appropriate network traffic. In various embodiments, any suitable portion of forwarding logic 220 may comprise fixed logic or programmable logic (e.g., software/computer instructions executed by the processor), such as a programmable processor, programmable digital logic (e.g., an FPGA, an EPROM, an EEPROM) or an ASIC that includes digital logic, software, code, electronic instructions, or any suitable combination thereof. In a particular embodiment, forwarding logic 230 comprises an ASIC that is operable to perform customized traffic forwarding in hardware by utilizing logic (e.g., one or more memories such as a TCAM) that is reprogrammable by an entity (e.g., the operating system 218) based on traffic customization information (e.g., received from a network administrator).

Forwarding logic 220 may include parsing logic operable to receive packets from the ingress ports of network element 108. The parsing logic may be configured to parse any necessary information from a received packet. Parsing logic may be configured to parse any suitable information, such as one or more protocols associated with the packet, a source IP address of the packet, a source MAC address of the packet, a destination IP address of the packet, a destination MAC address of the packet, or other suitable information from the packet. In some embodiments, the parsing logic is configured to parse information based on the information used in the forwarding entries. In some embodiments, the parsing logic is configured on a port-by-port basis, such that packets from each port may be parsed based on the forwarding entries associated with that port. The parsed information is passed to port selection logic, which is operable to receive forwarding entries from forwarding entry manager 220 and configure itself to implement the forwarding entries. For example, port selection logic may store the forwarding entries associated with a particular port in a content addressable memory. When a packet is received on that port, information parsed from the packet by parsing logic (and any other suitable information associated with the packet) may be passed to the port selection logic. The port selection logic may use this information to perform a lookup in the TCAM. Port selection logic may then forward the traffic through the appropriate port in accordance with the forwarding entry that matches the information parsed from the packet. If the packet is to be redirected, packet modification logic may modify the appropriate fields of the packet (e.g., destination IP address and/or destination MAC address) before the packet is forwarded out of the appropriate egress port of network element 108.

Figure 3A:
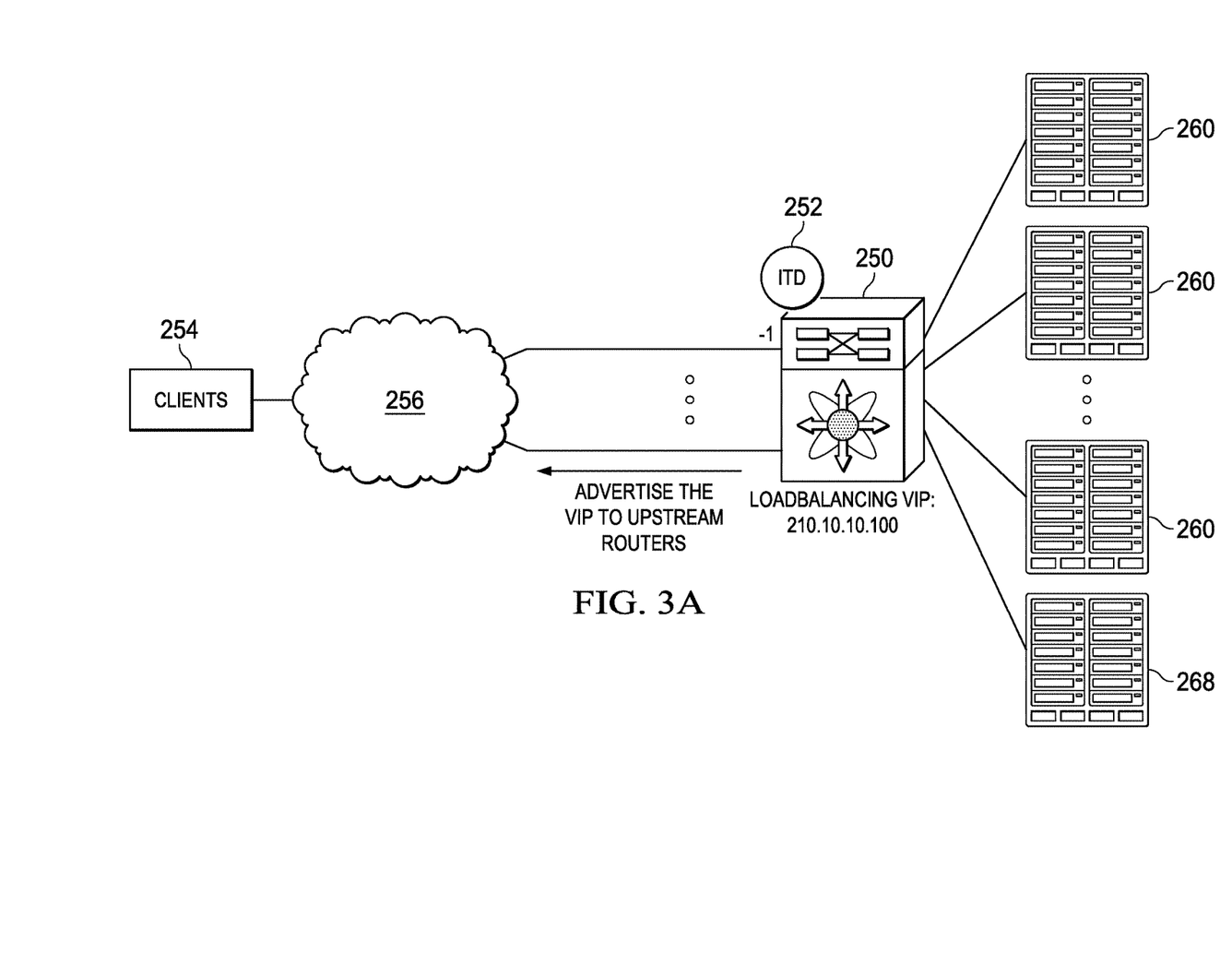
FIG. 3A is a simplified block diagram of a technique for route advertisement for native hardware-based VIP on an L2/L3 switch in accordance embodiments described herein.

In accordance with features of embodiments described herein, VIP traffic is handled in hardware by an ASIC. No traffic is sent to the switch supervisor and routes to VIPs are automatically generated and advertised to neighboring nodes. A CLI for advertising VIP routes to neighboring nodes is also provided. A VIP on a network element, such as network element 108 (which may be implemented as a Nexus series switch available from Cisco Systems, Inc., of San Jose, Calif.) may be advertised as illustrated in FIG. 3.

As illustrated in FIG. 3, a load balancing VIP 210.10.10.100 may be established on a network element 250, illustrated in FIG. 3 as a switch having an ITD service 252 installed thereon. In order for clients 254 to know how to reach the VIP (i.e., what routes to be followed to reach the VIP), as described in greater detail below, embodiments herein establish an automated mechanism for generating routes and advertising them to neighboring routers comprising a network 256, such that the routes may be further propagated through the network. As described in greater detail below, an advertise CLI automatically creates a route on the network element 250 to be advertised to neighboring routers to enable the neighboring routers to forward packets, destined for the VIP 210.10.10.100, to a designated ingress interface on the network element 250. Load distribution may be implemented at the network element 250 using an src-ip based loopback scheme, in which the VIP address (210.10.10.100) is configured as a loopback address on the network element. Address Resolution Proxy ("ARP") for VIP must be installed on the network element 250. By providing an automated way in which to distribute a VIP address in a network, the traffic may be load balanced to backend servers 260, thereby achieving massive scalability. Embodiments described herein also make network configuration more automated and hence less error prone, as well as reducing operational expenses.

Figure 3B:
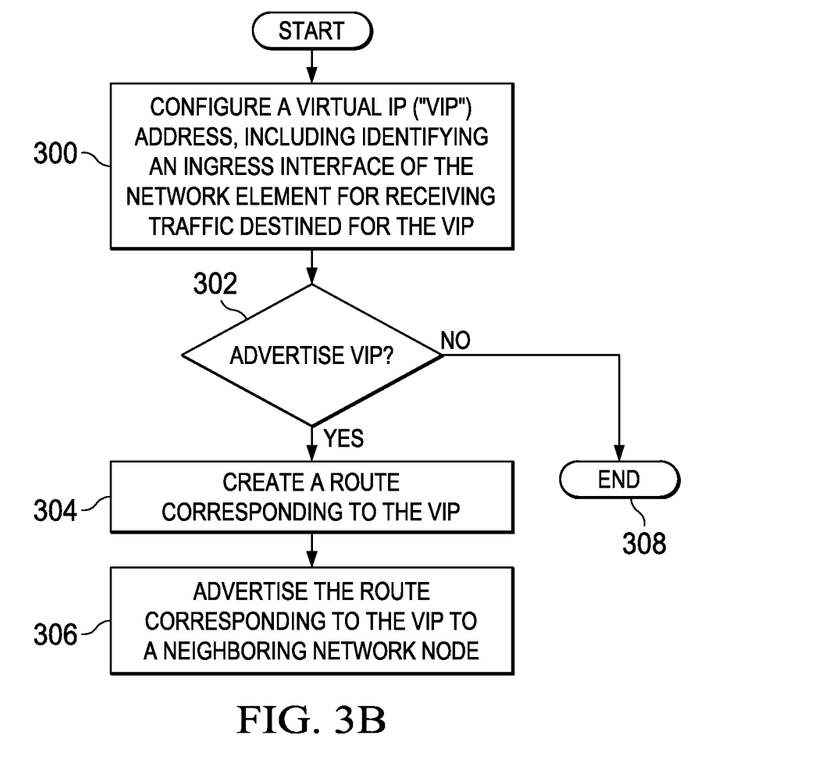
FIG. 3B is a flow chart of a technique for providing route advertisement for a native hardware-based VIP address on a L2/L3 switch in accordance with embodiments described herein.
Figure 4:
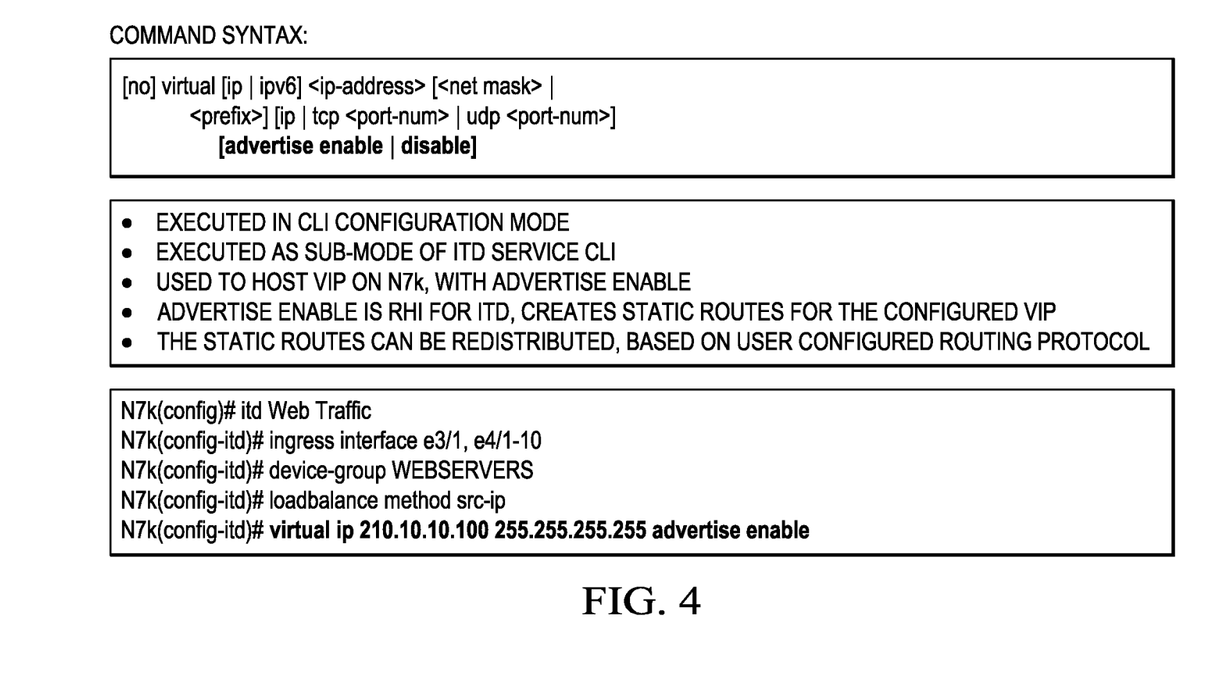
FIG. 4 illustrates example CLI code that may be used to create a route on a network element to be advertised to neighboring routers in accordance with embodiments described herein.
Figure 5:
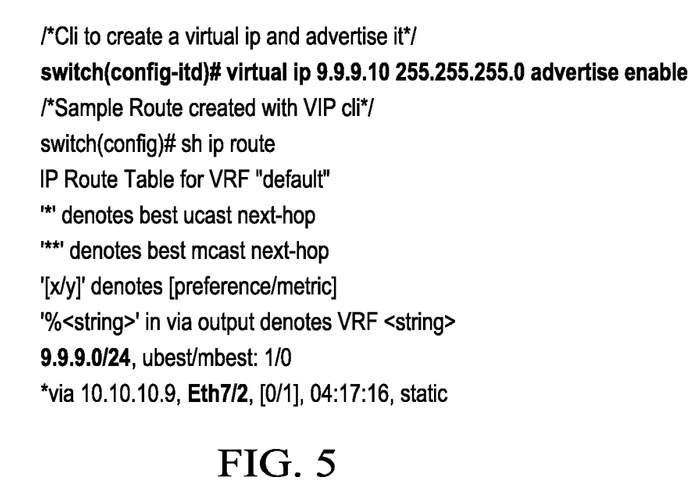
FIG. 5 illustrates example CLI code for creating a VIP and advertising it to neighboring routers in accordance with embodiments described herein.

FIG. 3B is a flow chart of a technique for providing route advertisement for a native hardware-based VIP address on a L2/L3 switch in accordance with embodiments described herein. As shown in FIG. 3B, in step 300, a VIP address is configured on a network element, such as network element 108. In accordance with features described herein, configuring a VIP address includes identifying an ingress interface of the network element designated to receive traffic destined for the VIP. Additionally, the configuring may include indicating a netmask for the VIP. An example of VIP configuration is illustrated in FIG. 5. Configuring the VIP address may also include indicating whether the VIP is to be advertised to neighboring nodes. In step 302, a determination is made whether the VIP configured in step 300 is to be advertised or not. If so, execution proceeds to step 304, in which a route corresponding to the VIP configured in step 300 is created (FIG. 4). In step 306, the route is advertised to neighboring network nodes. If in step 302 it is determined that the VIP is not to be advertised, execution ends in step 308.

FIG. 4 illustrates a VIP advertise CLI used to create a route on the network element to be advertised to neighboring routers. As shown in FIG. 4, the command syntax for creating a VIP and associated routes includes an indication of a choice of IP protocol (either IPv4 ("ip") or IPv6 ("ipv6")), an indication of a network IP address ("<ip-address>"), an indication of a netmask or prefix ("<netmask>|<prefix>"), an indication of a TCP or UDP port number ("IP|TCP <port-num>|udp <port-num>") (optional), and an indication of whether VIP advertising is to be enabled or disabled ("[advertise enable|disable]"). The above-illustrated command is executed in CLI configuration mode and as a submode of ITD service CLI. It is used to host VIP on the network element, with advertisement thereof enabled. Advertise enable creates static routes for the configured VIP. The static routes can be redistributed, based on user-configured routing protocol. The ITD service CLI is also shown in FIG. 4 and enables identification/configuration of an ingress interface ("e3/1, e4/1-10"), a device group ("WEBSERVERS"), and a load balance method ("src-ip"), as well as the VIP with advertise "virtual ip 210.10.10.100 255.255.255.255 advertise enable")

FIG. 5 illustrates a CLI for creating a virtual IP 9.9.9.10 and advertising it. Once the VIP is configured with advertise, routing protocols are used to create one or more routes for the VIP, which are advertised to neighboring nodes via the ingress interface(s). Traffic for the VIP is then routed to the ingress interface of the network node via one of the advertised routes. A sample route entry is also depicted in which VIP address is 9.9.9.10 and the ingress interface to the server is Eth7/2. It should be noted that VIP has to be in a different subnet than the server IP. The route is advertised by the ITD service using route redistribution on the ingress interface.

Presented below is an example CLI for configuring an IPv6 address for VIP. The user has a choice of configuring either the network mask or the prefix length for an IPv6 VIP.

switch(config)# ltd device-group dev-v6
    switch(config-device-group)# node ipv6 aaaa:bbbb::cccc:dddd
    switch(config-device-group)# node ipv6 bbbb:cccc::dddd:eeee
    /*Configure ITD service with IPv6 VIP*/
    switch(config)# itd test-v6
    switch(config-itd)# device-group dev-v6 switch(config-itd)# ingress interface e4/1
    switch(config-itd)# virtual ipv6 abab:cdcd::efef:fefe 64 advertise enable
    switch(config-itd)# virtual ipv6 cdcd:efef::abab:fefe ffff:ffff::fefe:7f7f advertise enable
    switch(config-itd)# no shut The elements, shown and/or described with reference the FIGURES, are intended for illustrative purposes and are not meant to imply architectural limitations of machines such as those utilized in accordance with the present disclosure. In addition, network element 108 may comprise a machine that may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein may be implemented in software. In some embodiments, this software could be received or downloaded from a web server, provided on computer-readable media, or configured by a manufacturer of a particular element in order to provide features of embodiments described herein. In some embodiments, one or more of these features may be implemented in hardware, provided external to these elements, or consolidated in any appropriate manner to achieve the intended functionality.

In one example implementation, network element 108 is a network device or computing device, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Network element 108 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising steps of:
   configuring a native hardware based virtual IP address ("VIP") at a Layer 2/Layer 3 ("L2/L3") Application Specific Integrated Circuit ("ASIC") of a network element, wherein the configuring includes identifying at least one ingress interface of the network element for receiving traffic destined for the VIP and wherein the VIP is associated with a plurality of servers;
   determining whether the configuring indicates that the VIP is to be advertised;
   advertising the configured VIP address to at least one neighboring network node if the configuring indicates that the VIP is to be advertised, wherein the advertising is accomplished using Command Line Interface ("CLI") code; and
   refraining from advertising the configured VIP address if the configuring does not indicate that the VIP is to be advertised;
   wherein upon receipt at the ASIC of traffic at identified at least one ingress interface of the network element destined for the VIP, the ASIC selects one of the plurality of servers to which to forward the traffic and forwards the traffic to the selected one of the plurality of servers for processing.

2. The method of claim 1, further comprising creating at least one route corresponding to the VIP, wherein the advertising comprises advertising the at least one route to the at least one neighboring network node.

3. The method of claim 1, wherein the network element comprises a switch.

4. The method of claim 1, wherein the VIP is configured in accordance with one of Internet Protocol version 4 ("IPv4") and Internet Protocol version 6 ("IPv6").

5. The method of claim 1, wherein at least one of the configuring and the advertising is performed using a routing protocol.

6. The method of claim 1, wherein the VIP is configured in accordance with IPv4 and the configuring comprises indicating a netmask for the VIP.

7. The method of claim 1 further comprising receiving at the at least one ingress interface traffic destined for the VIP.

8. The method of claim 1, wherein the VIP is configured in accordance with IPv6 and wherein the configuring comprises indicating a prefix length for the VIP.

9. One or more non-transitory tangible media that includes code for execution and when executed by a processor is operable to perform operations comprising:

configuring a native hardware based virtual IP address ("VIP") at a Layer 2/Layer 3 ("L2/L3") Application Specific Integrated Circuit ("ASIC") of a network element, wherein the configuring includes identifying at least one ingress interface of the network element for receiving traffic destined for the VIP and wherein the VIP is associated with a plurality of servers;

determining whether the configuring indicates that the VIP is to be advertised; a<<4 advertising the configured VIP address to at least one neighboring network node if the configuring indicates that the VIP is to be advertised, wherein the advertising is accomplished using Command Line Interface ("CU") code; and     refraining from advertising the configured VIP address if the configuring does not indicate that the VIP is to be advertised;

wherein upon receipt at the ASIC of traffic at the identified at least one ingress interface of the network element destined for the VIP, the ASIC selects one of the plurality of servers to which to forward the traffic and forwards the traffic to the selected one of the plurality of servers for processing.

10. The media of claim 9, wherein the operations further comprise creating at least one route corresponding to the VIP, wherein the advertising comprises advertising the at least one route to the at least one neighboring network node.

11. The media of claim 9, wherein the network element comprises a switch.

12. The media of claim 9, wherein the VIP is configured in accordance with an Internet Protocol comprising one of Internet Protocol version 4 ("IPv4") and Internet Protocol version 6 ("IPv6").

13. The media of claim 9, wherein the configuring comprises indicating a netmask for the VIP.

14. The media of claim 9, wherein the operations further comprise receiving at the at least one ingress interface traffic destined for the VIP.

15. The media of claim 9, wherein the configuring comprises indicating a prefix for the VIP.

16. An apparatus comprising:

a memory element configured to store data; and a processor operable to execute instructions associated with the data;

wherein the apparatus is configured to:

configure a native hardware based virtual IP address ("VIP") at a Layer 2/Layer 3 ("L2/L3") Application Specific Integrated Circuit ("ASIC") of a network element, wherein the configuring includes identifying at least one ingress interface of the network element for receiving traffic destined for the VIP and wherein the VIP is associated with a plurality of servers;

determine whether the configuring indicates that the VIP is to be advertised; advertise the configured VIP address to at least one neighboring network node if the configuring indicates that the VIP is to be advertised, wherein the advertising is accomplished using Command Line Interface ("CU") code; and         refrain from advertising the configured VIP address if the configuring does not indicate that the VIP is to be advertised;

wherein upon receipt at the ASIC of traffic at the identified at least one ingress interface of the network element destined for the VIP, the ASIC selects one of the plurality of servers to which to forward the traffic and forwards the traffic to the selected one of the plurality of servers for processing.

17. The apparatus of claim 16, wherein the apparatus is further configured to create at least one route corresponding to the VIP, wherein the advertising comprises advertising the at least one route to the at least one neighboring network node.

18. The apparatus of claim 16, wherein the configuring comprises at least one of indicating a netmask for the VIP and indicating a prefix for the VIP.

19. The apparatus of claim 16, further configured to receive at the at least one ingress interface traffic destined for the VIP.

20. The apparatus of claim 16, wherein the VIP is configured in accordance with an Internet Protocol comprising one of Internet Protocol version 4 ("IPv4") and Internet Protocol version 6 ("IPv6").

\* \* \* \* \*